Patented July 13, 1948

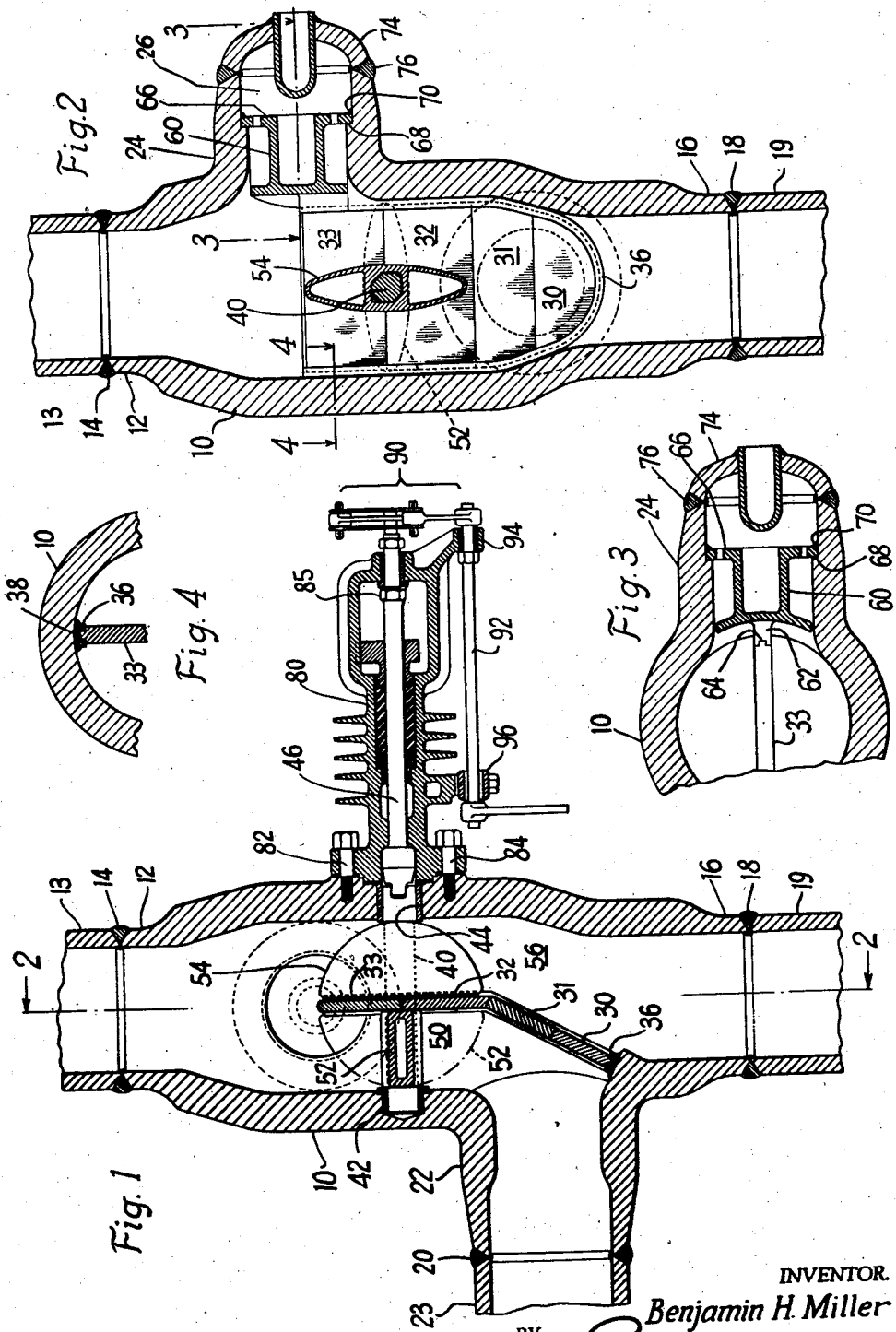

2,444,942

UNITED STATES PATENT OFFICE 2,444,942

VALVE CONSTRUCTION

Benjamin H. Miller, Akron, Ohio, assignor to The Babcock & Wilcox Company, Rockleigh, N. J., a corporation of New Jersey Application October 5, 1943, Serial No. 504,994

6 Claims. (Cl. 277—19)

This invention relates to a valve construction particularly adapted for use in high pressure fluid lines.

An object of the invention is to provide an improved valve construction capable of long continued use in large diameter fluid lines operating under high fluid pressures.

A further object is to provide such a valve construction which will be capable of long continued use with substantial elimination of leakage at the valve, under such high fluid pressures.

A further object of the invention is to provide a valve construction which may be readily assembled and easily disassembled for repair or maintenance without disconnecting the valve construction from its associated tubes.

The invention will be described with reference to the accompanying drawings in which the preferred embodiment of the construction is shown.

In the drawings:

Fig. 1 is a vertical section through a valve construction which controls the amount of superheated steam bypassing an attemperator;

Fig. 2 is a vertical section on the line 2—2 of Fig. 1, showing the bypass valve construction on a plane at right angles to the plane of the Fig. 1 section;

Fig. 3 is a detailed view showing a part of the bypass valve construction in horizontal section, on the line 3—3 of Fig. 2; and Fig. 4 is a detail horizontal section on the line 4—4 of Fig. 2.

The illustrative valve construction includes a tubular body 10 of heavy wall thickness so as to be capable of withstanding high fluid pressures. This body may be a unitary forging or it may be of welded construction. At its upper end it has a tubular inlet section 12 of reduced thickness where it is joined to a conduit 13 by the circumferential weld 14. The conduit 13 may be a steam line for conducting high pressure superheated steam to the valve construction. At the lower end of the valve body 10 there is a tubular outlet section 16 of reduced thickness, united by the weld 18 to the conduit 19 which may conduct the superheated steam to other apparatus, such as an attemperator.

The valve body 10 also has a bypass branch 22 joined to the bypass conduit 23 by the weld 20 and the upper part of the valve body is formed with a lateral tubular extension 24 (Fig. 2) to provide an opening 26 for the inspection, repair or replacement of the valve mechanism and the internal parts which are of such size that they may be inserted or removed through this opening.

The flow of the high pressure fluid in the valve body is divided by a diaphragm including the separately removable sections 30 to 33, inclusive. These sections are preferably held in their operative positions by a grooved guide strip 36 the cross section of which is shown in Fig. 4. This strip is of U-shaped construction as indicated in Fig. 2 and is preferably secured to the interior walls of the valve body with its lower part (the sections 30 and 31) at an angle to its upper part, as indicated in Fig. 1 of the drawings.

The lefthand leg of the grooved strip 36 terminates at the bottom the opening 26 (Fig. 2) in order that the diaphragm sections and the other internal valve parts can be removed or replaced through that opening. The side edges of the diaphragm sections are preferably provided with tongues such as the one shown at 38 in Fig. 4 seated in the groove of the strip 36 to hold the sections in their operative positions and to permit them to slide into such positions when the valve construction is being assembled.

The diaphragm sections 32 and 33 at their contacting edges adjacent the valve stem or shaft 40 are formed with appropriate notches so as to receive the shaft and to permit its operative turning movements. The opposite ends of this valve shaft are journaled within bearings 42 and 44 fitted into the side walls of the valve body 10, as clearly indicated in Fig. 1, and the end of the valve shaft within the bearing 44 is so formed that it has endwise interlocking engagement with a valve operating rod 46.

Within the bypass section 50 of the valve body there is a substantially semicircular valve member 52 non-rotatively mounted upon the valve shaft 40 for regulating the flow of fluid through the bypass 50 as the valve shaft is turned. A similarly shaped valve member 54 is non-rotatively mounted on that part of the valve shaft 40 which extends across the main channel 56 through the valve body. These valve members are mounted at right angles to each other, as shown, and each is provided with a polygonal opening for slidably receiving the correspondingly shaped portions of the valve shaft 40. Thus, when the valve member 54 is moved through the opening 26 to the position at which it is indicated in Fig. 1 the shaft 40 might then be slidably moved through the bearing 44 and then through the polygonal opening in the valve member 54. This valve member is thus held in place until the remaining valve member 52 is moved into its operative position. The shaft 40 is then moved through the central opening in the valve member 52 until its leading end is disposed within the bearing 42 as indicated in Fig. 1. Thereafter the upper diaphragm section 33 is moved through the opening 26 until its edge tongues align with the grooves in the upper portion of the strip 36. This diaphragm section is then dropped in place so that its lower edge contacts with the upper edge of section 32, the central recesses in these edges receiving the valve shaft as above indicated.

The upper diaphragm section 33 is further held against horizontal displacement, and the opening 26 is partially closed by the positioning of the member 60 in the opening, as indicated in Figs. 2 and 3. As shown in the latter figure this member is provided with a rib 62 which is grooved as indicated at 64 to provide an extension of the channel in the righthand leg of the strip 36. The illustrative valve construction is normally upright as indicated in Fig. 1 of the drawings and therefore gravity maintains the upper diaphragm section 33 in place between the channels or grooves at the opposite sides of the valve bore. The enlarged flange section 66 of the member 60 fits against the shoulder 68 of the lateral extension 24 and the member 60 is welded in this position as indicated at 70.

After the valve internals are assembled as above described, the access opening 26 is closed by a cap 74 which is welded thereto, as indicated at 76. The valve shaft 40 is retained in its operative position by its contact with the end of the valve rod 46, the latter being rotatively supported by a bearing member 80 secured to the valve body 10 as indicated at 82 and 84. The valve rod 46 is normally prevented from having endwise movement outwardly of the bearing member 80 by its enlarged section 85. The outer end of the rod 46 is connected by linkage 90 to a rock-shaft 92 rotatively mounted in the bearings 94 and 96 which are fixed to extensions of the bearing member 80. This rock-shaft may be automatically actuated by devices responsive to changes in the temperature of the fluid passing through the valve, or in response to other operative factors such as fluid flow. For example, the tubular inlet 13 for the illustrative valve construction is intended to receive superheated steam part of which passes through the conduit 19 to an attemperator. The remainder of the superheated steam passes through the conduit 23 to a second superheater section and then to a point of junction with the steam which has been cooled by passing through the attemperator. A thermal device responsive to the changes in temperature of the steam either at the outlet of the first superheater section or at a position beyond the junction of the attemperated steam with the remainder of the steam, is effective upon the shaft 92 of the illustrative valve construction to vary the positions of the valve members 52 and 54 in accordance with the departure of the temperature of the superheated steam from a predetermined value. If, for example, the temperature of the superheated steam rises above the predetermined value at any particular time, the temperature responesive device will be operative upon the illustrative valve construction to move the valve member 54 to permit more steam to pass through the conduit 19 and thence through the attemperator and less steam through the conduit 23 and thence to the secondary superheater. The converse operation will take place when the steam temperature at the temperature responsive device falls below the predetermined value.

Although the invention has been described with reference to the specific construction illustrated in the drawings it is to be appreciated that it is not limited to all of the details thereof. It is rather to be understood that the invention is to be taken as of a scope commensurate with the scope of the subjoined claims.

I claim:

1. In a valve construction, a branched valve body, and a removable diaphragm construction including a plurality of sections normally fixed within the valve body and aligned from a position at one side of the branch to thereby continue the branch into the valve body, and a flow regulator operable in said valve body and having a part extending into the diaphragm, said valve body being provided with a removable wall portion adjacent one of the diaphragm sections, the removal of said wall portion providing a port which affords access for removal of said diaphragm sections and the flow regulator.

2. In a valve assembly, an upright heavy wall tubular section constituting a valve body, said tubular section being provided with a lateral branch, a diaphragm construction including a plurality of removable sections normally aligned so as to continue the branch into the valve body, a valve shaft normally extending across the interior of the valve body and through said diaphragm, said valve shaft being rotatably and slidably mounted in the valve body so as to be slidable into operative position from one side of the valve body, oppositely effective valve members non-rotatively mounted on said valve shaft and positioned on opposite sides of the diaphragm, the value members extending in different directions from the value shaft, and means for operating said valve shaft, said valve body being provided with a lateral wall portion removable to present an opening through which all of the above indicated diaphragm sections and valve members may be removed or replaced.

3. In a valve construction, a branched valve body of heavy wall thickness and unitary construction so as to withstand high fluid pressures, said valve body having within it a diaphragm construction separating it into branches and consisting of a plurality of removable sections, a valve shaft extending through said diaphragm construction and across the interior of the valve body, a valve member on one side of the diaphragm and non-rotatively related to the valve shaft in a position to control the flow through a branch of the valve body as the shaft is operated, a second valve member on the other side of the said diaphragm construction and non-rotatively mounted on the valve shaft at an angle to the first valve member so as to be oppositely effective to said first valve member to control the flow of fluid through the remaining part of the valve chamber, said valve body being provided with a lateral extension through which the diaphragm section and valve members can be removed or replaced, and means for sealing the opening in said lateral extension.

4. In a valve construction, a valve body, and a removable diaphragm construction extending across and longitudinally of the valve body and including a plurality of sections normally aligned to separate passages within said body, said valve body being provided with a lateral wall portion removable to present an opening to provide access for removal of said diaphragm sections.

5. In a valve construction, a generally tubular valve body constructed of thick walled sections permanently welded together, the valve body having inlet and outlet portions adapted to be permanently connected into a fluid line, a valve member within the body, the valve body being constructed to provide a normally covered opening which may be uncovered for access to the interior of the valve construction, and a transverse diaphragm extending longitudinally of the interior of the valve body and consisting of a plurality of aligned and removable sections of such size that they may be separately removed through said opening in the valve body without disconnecting the latter from the fluid line.

6. In a branched valve construction, a tubular valve body presenting a main fluid flow path and a branch communicating therewith, a removable diaphragm construction including a plurality of aligned sections normally fixed transversely of the valve body and constituting a continuation of the branch into the valve body, a valve shaft rotatably mounted within the valve body and extending transversely of the branch and the main fluid flow path, and oppositely effective valve members secured to the shaft at different radial positions on opposite sides of the diaphragm and operable respectively across the branch and the main fluid flow paths, one of said valve members being operable to close the branch while the other valve member is opening the main fluid flow path, said valve body being also provided with a lateral extension adapted to present an access opening for removal or replacement of the diaphragm sections and the valve member.

BENJAMIN H. MILLER.

REFERENCES CITED

The following references are of record in the file of this patent:

UNITED STATES PATENTS

| Number | Name | Date |
| --- | --- | --- |
| 1,398,976 | Ryder | Dec. 6, 1921 |
| 2,052,313 | Payne | Aug. 25, 1936 |
| 2,133,091 | Kerr | Oct. 25, 1938 |
| 2,363,943 | Carlson | Nov. 28, 1944 |

Certificate of Correction

Patent No. 2,444,942.  July 13, 1948.

BENJAMIN H. MILLER

It is hereby certified that errors appear in the printed specification of the above numbered patent requiring correction as follows:

Column 2, line 15, after the word "bottom" insert *of*; column 3, line 69, for "responesive" read *responsive*; column 4, lines 38 and 39, claim 2, for "value" read *valve*;
and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*